May 30, 1967  J. E. MIDDLETON ETAL  3,322,637
NUCLEAR REACTOR REFUELLING INSTALLATION
Filed April 12, 1965  4 Sheets-Sheet 1

United States Patent Office 3,322,637
Patented May 30, 1967

3,322,637
NUCLEAR REACTOR REFUELLING
INSTALLATION
John Ernest Middleton, Culcheth, Warrington, and David
Colin Emerson, Appleton, Warrington, England, assignors to United Kingdom Atomic Energy Authority,
London, England
Filed Apr. 12, 1965, Ser. No. 447,312
Claims priority, application Great Britain, May 13, 1964,
20,024/64
1 Claim. (Cl. 176—30)

This invention relates to nuclear reactor installations and to refuelling machines therefor.

According to the invention in a nuclear reactor installation of the kind including a refuelling machine which is supported eccentrically in a first circular shield member which is rotatable above a reactor core in an aperture placed eccentrically in a second circular shield member which is also rotatable, a linked fluid flow connection from a fixed point outside the perimeter of the second circular shield member for the refuelling machine is characterised in that said linked fluid flow connection consists of two links, the first link extending from a sealed pivotal connection at said fixed point to a sealed pivotal connection defining an elbow and the second link extending from said elbow to a sealed pivotal connection on the first circular shield member, said second link being deflected from the straight line between the elbow and the sealed pivotal connection on the first circular shield member in the plane of its movement.

In any linked fluid flow connection arrangement it is obviously desirable to reduce the number of links to a minimum as each link involves increased mechanical complexity. A two-link system is particularly desirable as it provides an unambiguous system, that is, with the position of the refuelling machine defined, the positions of both the links are defined. However, a simple two straight-link system may not suffice where the zone of movement required for the refuelling machine is large compared with the zone of movement available to the links.

By applying the deflection from the straight line of the second link the area of non-availability to the refuelling machine is significantly reduced.

A construction of a nuclear reactor installation embodying the invention will now be described, by way of example, with reference to the accompanying drawings, wherein.

Figure 1:
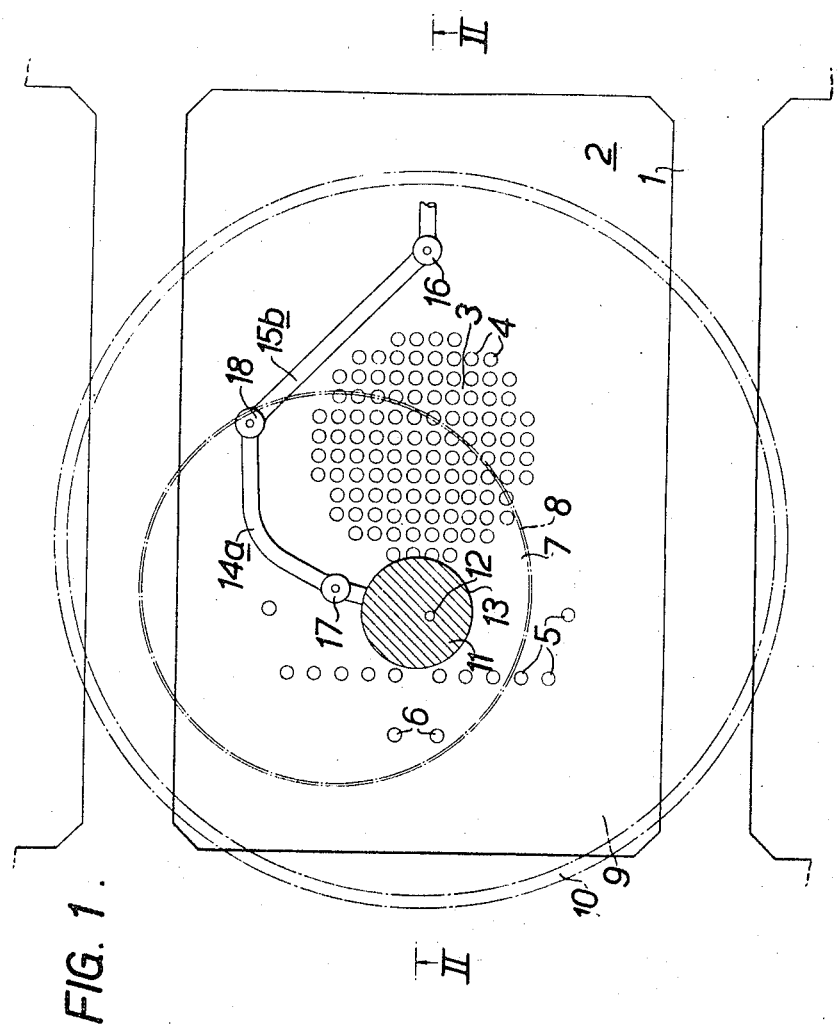
FIGURE 1 is a fragmentary plan view, in section on line I—I of FIGURE 2.
Figure 2:
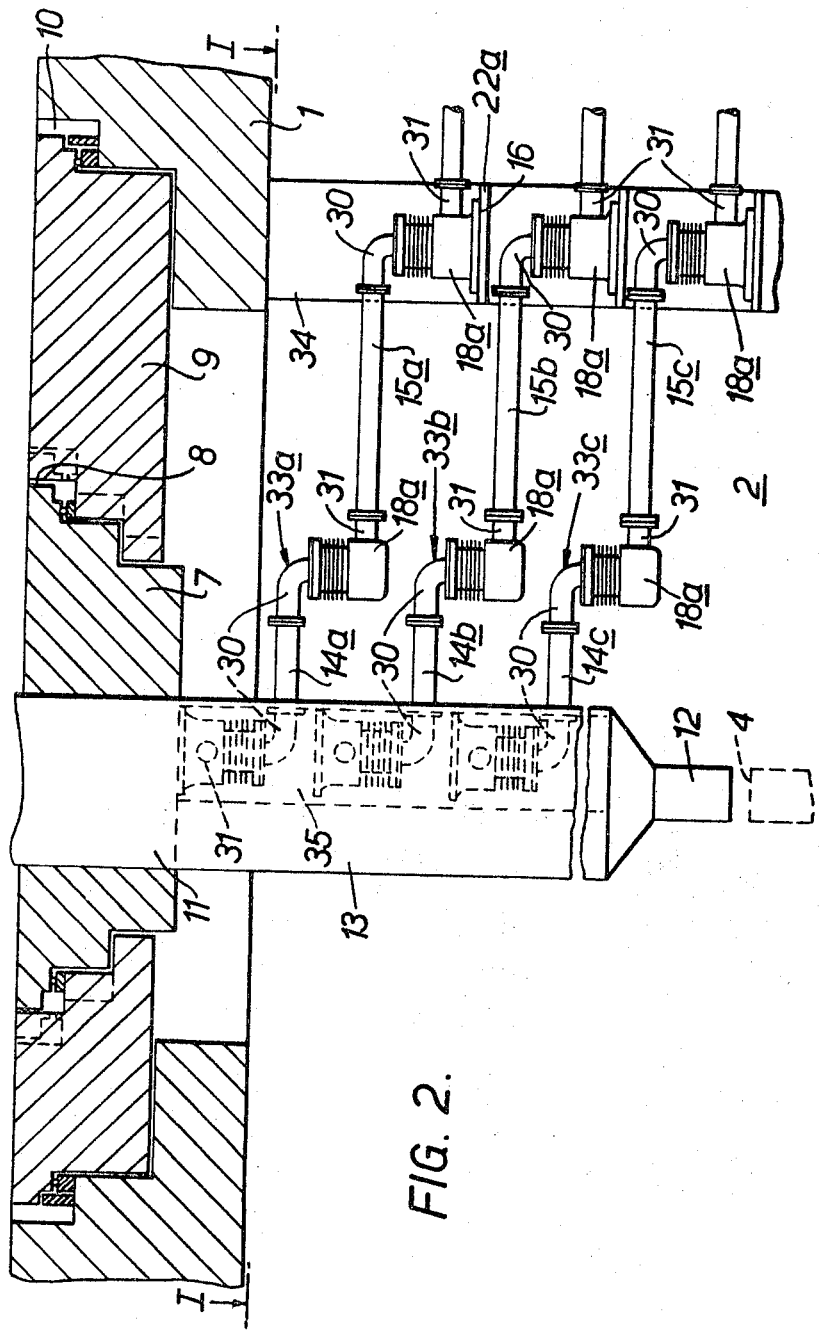
FIGURE 2 is a fragmentary side view in cross section on line II—II of FIGURE 1.
Figure 5:
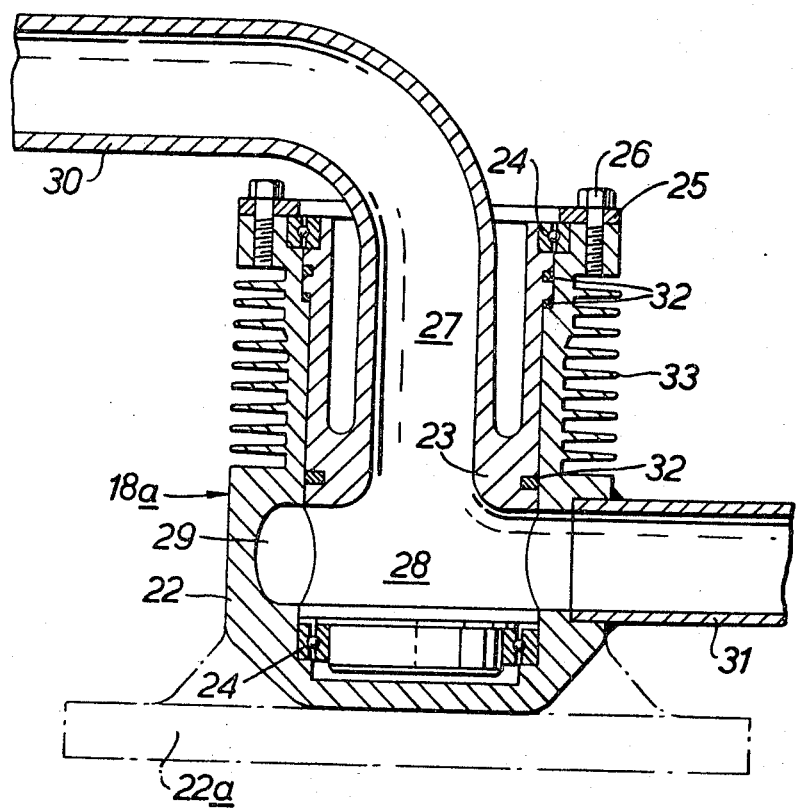
FIGURE 5 is a side view in medial cross-section of a sealed pivotal connection.

In the construction shown in FIGURES 1 and 2 there is a concrete containment 1 defining a vault 2 which houses the core 3 of a nuclear reactor. The core comprises a cylindrical tank containing heavy water which serves as a moderator. The tank is penetrated from end to end by one hundred and twelve vertically disposed tubes arranged on a square lattice pitch. The tubes are penetrated by tubular members defining fuel element channels which are connected at their lower ends and at branch pipes located within their upper end regions into a coolant circuit. The fuel element channels contain nuclear fuel elements and conduct fluid coolant upwardly in heat exchange with the fuel elements. The coolant consists of steam or water or a mixture of steam and water which leaves the tubular members at pressure of approximately 1000 p.s.i.g. and 280° C. Access is gained to the fuel element channels for the insertion and withdrawal of fuel elements through the upper ends; closable end openings are shown and designated 4 in FIGURES 1 and 2. A nuclear reactor installation of this type has been described in Nuclear Engineering of February 1964. The vault 2 contains twelve storage tubes 5 for replacement fuel and has two ports 6 for discharge of irradiated fuel to a cooling pond (not shown) sited adjacent the vault 2. A first circular shield member 7 is rotatable in an aperture 8 placed eccentrically in a second circular shield member 9 which is rotatable in an opening 10 of the vault 2. The first and second circular shield members form covers for the vault. A refuelling machine 11 for inserting and withdrawing fuel elements in and from the fuel element channels is mounted eccentrically on the member 7 and extends above and below it, a snout for engaging the opening 4 of the fuel element channels being shown at 12. The boundary of that part of the refuelling machine which extends below the shield member 7, that is, the outer surface of its thermal lagging, is shown at 13. The refuelling machine 11 has a chamber for housing irradiated and new fuel elements, and has a winch for hoisting and lowering the fuel elements from and into the fuel element channels via the snout 12 and opening 4. Three linked fluid flow connections 33a, 33b, 33c are disposed one above the other and extend from a pivot 16 located at a fixed point outside the shield member 7 to a pivot 17 at the rotational axis of the shield member 7. Each fluid flow connection has two links, 14, 15 which are joined at an elbow 18 and the link 14 is deflected from the straight line between the elbow 18 and the pivot 17 in the horizontal plane. The pivots 16, 17 and elbow 18 include sealed pivotal connections 18a shown typically in FIGURE 5.

The sealed pivotal connections 18a each comprise a cup shaped housing 22 having a hollow core member 23 which is rotatable in the housing on ball races 24. The core member 23 is retained in the housing 22 by a retaining ring 25 secured by set bolts 26. The core member 23 has a central duct 27 communicating with a transverse duct 18 which communicates with an internal annular recess 29 in the housing 22. A pipe 30 connects with the central duct 27 and a pipe 31 connects with the annular recess 29. The annular sealing members 32 of synthetic rubber serve as gland seals between the core member 23 and housing 22. The housing 22 has circumferential cooling fins 33 on its outer surface. Where the sealed pivotal connection 18a is used at the elbow 18, the pipe 30 is connected to the link 14 and the pipe 31 is connected to the link 15. Where the sealed pivotal connection is used at pivot 16 the housing 22 is fixedly secured to a bracket 34 (by means of a flange shown in broken line in FIGURE 5 and designated 22a), attached to the concrete containment 1 the pipe 30 is connected to the link 15 and the pipe 31 is connected to a fluid flow pipe connected into the coolant circuit. Similarly, where the sealed pivotal connection is used at pivot 17, the housing 22 is fixedly secured to a bracket 35 attached to the first circular shield member 7, the pipe 30 is connected to the link 14 and the pipe 31 is connected to the refuelling machine.

In use the members 7 and 9 are rotated to register the snout 12 of the refuelling machine with one of the openings 4, storage tubes 5 or ports 6. Where "on load" discharge and charging of a fuel element assembly from or into the core is to be effected, a seal is made between the snout and the fuel element channel. Steam and water coolant pass from the fuel element channel into the refuelling machine thence via fluid flow connection 33a to dump in the cooling pond. The coolant passing through the fuel element channel into the refuelling machine serves to cool irradiated fuel elements in transit from the channel to the refuelling machine and any irradiated fuel element already contained within the machine. When the refuelling machine contains irradiated fuel elements and is disconnected from the core of the reactor, for example when transferring an irradiated fuel element to the cooling pond via the ports 6, steam coolant is supplied to the refuelling machine via the linked fluid flow connection 33b thence to the cooling pond via the linked fluid flow connection 33a. The linked fluid flow connection 33c provides a drain for water from the lower region of the chamber of the refuelling machine.

Figure 3:
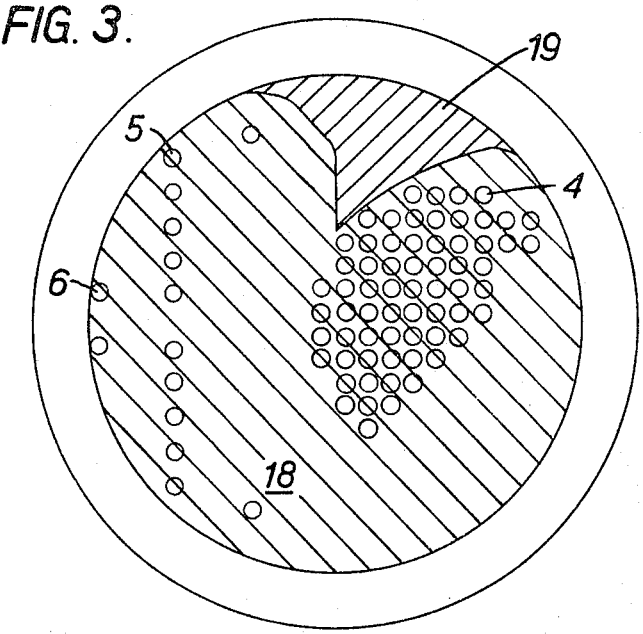
FIGURE 3 is a diagrammatic plan view showing the area of the installation which is accessible to the refuelling machine constructed according to the invention.

The deflection of the links 14 provides clearance for the refuelling machine so that the machine can command an area of the vault 2 which will enable it selectively to connect with any one of the one hundred and twelve fuel element channels, storage tubes 5 or ports 6. The area commanded by the machine is shown hatched in FIGURE 3 and designated 18 whereas the area of non-availability is designated 19.

Figure 4:
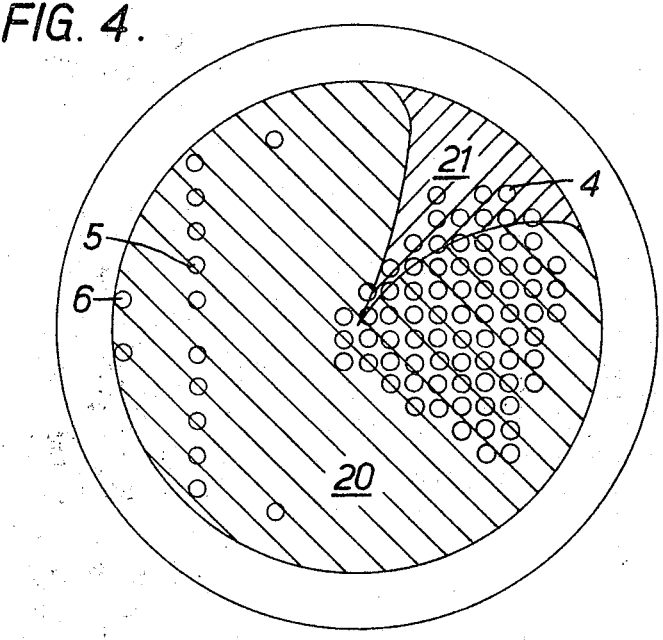
FIGURE 4 is a diagrammatic plan view showing the area of the installation which is accessible to a typical refuelling machine not constructed in accordance with the invention.

FIGURE 4 shows an area hatched and designated 20 which could be commanded by the machine if the link 14 were straight, the area of non-availability being designated 21. It can be seen that several of the fuel element channels cannot be connected to the snout of the machine.

Of course it is appreciated that by varying the position of the fixed point 16 the area of non-availability could be angularly displaced, but in all positions there are some channels 5 in the vicinity of the rotational axis of the member 9 which cannot be connected.

We claim:
A nuclear reactor installation comprising:
a nuclear core having access openings for insertion and withdrawal of fuel elements,
a refuelling machine disposed above said core and adapted to be connected to said access openings,
a first rotatable circular shield member for supporting said refuelling machine eccentrically to the rotational axis of said member,
a second rotatable circular shield member having an aperture disposed eccentrically to the rotational axis of said second member and within which aperture said first member is rotatable,
at least one linked fluid flow connection extending from a sealed pivotal connection with a fluid flow conducting pipe at a fixed point outside the perimeter of the second circular shield member to a sealed pivotal connection with a fluid flow conducting pipe at a fixed point on said first circular shield member, said linked fluid flow connection consisting of first and second links interconnected by a sealed pivotal connection defining an elbow, at least said second link being deflected from the straight line between said elbow and said fixed point on said first circular shield member in the plane of movement of said second link.

References Cited
UNITED STATES PATENTS

| | | | |
|---|---|---|---|
| 3,044,947 | 7/1962 | Payne | 176—30 |
| 3,054,741 | 9/1962 | Tatlock et al. | 176—30 |
| 3,090,741 | 5/1963 | Fawcett | 176—30 |
| 3,158,544 | 11/1964 | Long et al. | 176—32 |

L. DEWAYNE RUTLEDGE, *Primary Examiner.*

CARL D. QUARFORTH, *Examiner.*